(12) United States Patent
Coverdale et al.

(10) Patent No.: US 6,373,842 B1
(45) Date of Patent: Apr. 16, 2002

(54) UNIDIRECTIONAL STREAMING SERVICES IN WIRELESS SYSTEMS

(75) Inventors: Paul Coverdale, Nepean; Leo Strawczynski, Ottawa, both of (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/195,400

(22) Filed: Nov. 19, 1998

(51) Int. Cl.[7] .............................................. H04L 12/56
(52) U.S. Cl. ...................................... 370/394; 714/748
(58) Field of Search ................................. 370/428, 429, 370/394, 231; 714/748, 749, 751, 18, 48; 379/93.24; 709/231

(56) References Cited

U.S. PATENT DOCUMENTS

| | | | | |
|---|---|---|---|---|
| 4,967,413 A | * | 10/1990 | Otani | 714/748 |
| 5,255,268 A | * | 10/1993 | Cato et al. | 370/428 |
| 5,327,486 A | * | 7/1994 | Wolff et al. | 379/96 |
| 5,418,835 A | * | 5/1995 | Frohman et al. | 379/57 |
| 5,502,757 A | * | 3/1996 | Bales et al. | 379/58 |
| 5,546,382 A | * | 8/1996 | Fujino | 370/429 |
| 5,548,636 A | * | 8/1996 | Bannister et al. | 379/201 |
| 5,553,083 A | * | 9/1996 | Miller | 714/748 |
| 5,563,895 A | * | 10/1996 | Malkamaki et al. | 714/749 |
| 5,566,163 A | * | 10/1996 | Petit | 370/429 |
| 5,570,367 A | * | 10/1996 | Ayanoglu et al. | 370/428 |
| 5,602,829 A | * | 2/1997 | Nie et al. | 370/428 |
| 5,680,322 A | * | 10/1997 | Shinoda | 714/748 |
| 5,699,367 A | * | 12/1997 | Haartsen | 714/786 |
| 5,719,883 A | * | 2/1998 | Ayanoglu | 370/428 |
| 5,742,905 A | * | 4/1998 | Pepe et al. | 455/461 |
| 5,768,527 A | * | 6/1998 | Zhu et al. | 370/231 |
| 5,777,988 A | * | 7/1998 | Cisneros | 370/238 |
| 5,793,861 A | * | 8/1998 | Haigh | 379/266 |
| 5,802,466 A | * | 9/1998 | Gallant et al. | 455/413 |
| 5,818,852 A | * | 10/1998 | Kapoor | 714/749 |
| 5,844,918 A | * | 12/1998 | Kato | 714/786 |
| 5,892,759 A | * | 4/1999 | Taketsugu | 370/428 |
| 5,896,394 A | * | 4/1999 | Fukuda | 714/749 |
| 5,918,002 A | * | 6/1999 | Klemets et al. | 714/18 |
| 6,014,706 A | * | 6/1999 | Cannon et al. | 709/231 |
| 5,933,778 A | * | 8/1999 | Buhrmann et al. | 455/461 |
| 5,946,312 A | * | 8/1999 | Suzuki | 370/428 |
| 6,002,750 A | * | 12/1999 | Ertz | 379/88.12 |
| 6,069,888 A | * | 5/2000 | LaRocca | 370/342 |
| 6,014,757 A | * | 8/2000 | Rhee | 714/18 |

OTHER PUBLICATIONS

Papadopoulos et al, "Retransmission–Based Error Control for Continuous Media Applications", Network and Operating System Support for Digital Audio, 1996, pp. 5–12.*

* cited by examiner

Primary Examiner—Melvin Marcelo
Assistant Examiner—Phuongchau Ba Nguyen
(74) Attorney, Agent, or Firm—Jeff Measures

(57) ABSTRACT

A high layer protocol organizes Unidirectional Streaming Services (USS) data into frames and said data is transmitted to the wireless user's terminal. The USS data is not delivered until a criteria is satisfied, e.g., the receive buffer is filled to an appropriate value. After the USS data is received, the receiver verifies the received frames. If an error is detected a message is sent from the wireless terminal to the server (providing the unidirectional streaming service) requesting retransmission of the corrupted frame. This is a form of ARQ protocol. If the retransmitted frame arrives prior to the time that frame needs to be delivered, the corrupted frame is replaced by the retransmitted frame. Otherwise, if the retransmitted frame is not received prior to the time that frame needs to be delivered, the corrupted frame is reconstructed. Any retransmitted frame which arrives too late is discarded. An additional benefit of the present invention is that since the frames are buffered prior to delivery, interpolation, as opposed to extrapolation, can be used to improve the reconstruction quality of the corrupted frame. This optional feature of the invention uses both the preceding and succeeding frames, which are available in the buffer, to provide a better estimate of the corrupted frame.

44 Claims, 6 Drawing Sheets

RECEIVER FUNCTIONAL BLOCKS

TRANSMITTER FUNCTIONAL BLOCKS

UNIDIRECTIONAL STREAMING SERVICES IN WIRELESS SYSTEMS

FIELD OF THE INVENTION

The present invention relates to unidirectional streaming services (e.g. voice mail and Internet audio/video distribution) in wireless systems, with particular applications for improving the reception quality of unidirectional streaming services data.

BACKGROUND TO THE INVENTION

In digital wireless systems there exists a need to support stream based services. Stream based service are services where information is delivered to the user while data is being received, rather than waiting for all of the information to be received before commencing delivery, for example, voice or video clips. In principle, stream based services cannot accept lengthy or variable delays in transmission. For example, for a normal interactive voice call, the speech signals are transmitted and delivered with as little delay as possible, in order to avoid upsetting the natural conversational dynamics. Typically, in order to ensure real-time delivery, stream based services have required dedicated communication channels (e.g., circuit switched calls, which are typically full duplex) in order to avoid lengthy delays in transmission. Recently, streaming services data, for example voice over IP, have been transmitted using packet services which require quality of service (Q of S) controls to avoid lengthy and variable delays.

However, for conventional packet data sent by wireless transmission, receiving uncorrupted data is typically considered sufficiently important to allow for delays in order to retransmit corrupted data. Thus, error detection and Automatic Repeat Request (ARQ) protocols are used to ensure accurate transmission of data. These retransmissions cause delays which are unacceptable for real time delivery of speech and other stream-based services.

The inability to wait for the retransmission of corrupted data is a problem which affects the quality of the received voice/video data in wireless transmission systems, as a result of drop-outs and short interruptions of the radio channel caused by interference, multipath fading and blocking, etc.

Furthermore, conventional digital wireless systems have handled unidirectional streaming services (for example, voice-mail playback and internet audio/video distribution) similar to bi-directional circuit-switched voice services.

FIG. 1 is an example of a wireless system retrieving a voice message (a unidirectional voice streaming service) in a conventional manner. This system treats the voice message in the same manner as real time, interactive speech. First, the incoming voice signal from the voice-mail server is organized into speech frames according to the specific speech encoding technique used in the air interface. These speech frames are then transmitted in a manner which is well known in the art. Following the particular air interface speech coding and processing technology, which is also well known in the art, the received frame containing an error is reconstructed by extrapolating the preceding speech frame(s). In this example, the error detection means determines that there is an error in frame 2. In this example, frame 2 would be reconstructed to the extent possible by extrapolating frame 1.

This conventional method of providing unidirectional streaming services is susceptible to the above mentioned wireless transmission impairments. While extrapolation of corrupted data often improves quality compared to simply converting the corrupted data into speech, the speech quality is still degraded.

There exists, therefore, a need for improving the reception quality of unidirectional streaming services data in wireless systems.

SUMMARY OF THE INVENTION

It is an object of the present invention to provide a method for improving the reception quality of unidirectional streaming services (USS). Note that this is expected to be particularly advantageous in wireless systems and this specification will discuss specific embodiments for wireless networks. However, the invention can also be used in other networks which transmit USS data, for example, internet audio/video distribution.

According to one aspect of the present invention this objective is met by storing received USS data frames in a buffer prior to commencing delivery to the user application or recipient. Note that for the purposes of this document, received data refers to the data stream as received over the communication channel. The individual packets comprising this data stream may not be received at regular intervals, or even in the same order as they were sent. Delivered data refers to the data stream finally delivered to the user (often via some intermediate application for example a speech decoder). In this case, the individual packets will have been re-assembled into the correct order, and any irregularities in inter-packet timing corrected.

Advantageously, the inventors have recognized that although frames must be delivered at a constant rate, for example, in order to maintain speech dynamics, an initial delay prior to initiating delivery will typically be acceptable. This fact can be exploited to improve the reception quality by storing a plurality of received frames in a buffer prior to delivery, and using the delay introduced by the buffer to allow for retransmission to replace frames received with errors. Depending on the system and its capacity, this can delay the delivery of the USS data, which until now has been considered unacceptable according to conventional thinking regarding USS data, such as audio or video data. The inventors have determined that the limitations which prevent delays in interactive, real-time, streaming services data, for example a typical live telephone conversation, are not the same for unidirectional streaming services. For an interactive telephone call, no significant delay can be accepted as either party can speak at any moment in time. Therefore, all data must be transmitted in substantially real-time as there is no predictability as to when a user will speak. This has typically required a circuit switched connection, which are typically full duplex.

However, the inventors have recognized this does not hold true for unidirectional streaming services. The data must be delivered at a constant rate (e.g., a normal talking rate for voice data), but as the service is undirectional, its delivery requirements are predictable. The inventors have determined that, by storing received frames in a buffer prior to the delivery of the data, the transmission rate need not be the same as the delivery rate. Thus, the addition of a buffer can be used to improve reception quality, by providing the system with time to replace USS data frames received with errors (or not received at all due to frame loss in the transmission medium). For example, the buffer allows for the retransmission of corrupted data by using an ARQ protocol. Advantageously, such a system will require less voice frame reconstruction than conventional systems.

In operation, let us look at the example of a wireless network transmitting USS data to a wireless terminal. A high layer protocol organizes the USS data into frames and said data is transmitted to the wireless user's terminal. The USS data is not delivered until a criteria is satisfied, e.g., the receive buffer is filled to an appropriate value. After the USS data is received, the receiver verifies the received frames. If an error is detected a message is sent from the wireless terminal to the server (providing the unidirectional streaming service) requesting retransmission of the corrupted frame. This is a form of ARQ protocol. If the retransmitted frame arrives prior to the time that frame needs to be delivered, the corrupted frame is replaced by the retransmitted frame. Otherwise, if the retransmitted frame is not received prior to the time that frame needs to be delivered, the corrupted frame is reconstructed. Any retransmitted frame which arrives too late is discarded. An additional benefit of the present invention is that since the frames are buffered prior to delivery, interpolation, as opposed to extrapolation, can be used to improve the reconstruction quality of the corrupted frame. This optional feature of the invention uses both the preceding and succeeding frames, which are available in the buffer, to provide a better estimate of the corrupted frame.

Another aspect of the present invention is that, as the USS data will be stored in a buffer of the wireless terminal prior to delivery, the USS data does not have to be transmitted over the wireless interface at its delivery rate (e.g., a normal talking rate). Preferably, the transmission rate is faster than the constant delivery rate. Preferably, for wireless systems which can use variable transmission rates, the USS data can be transmitted as packets with a variable transmission rate, which will typically conserve bandwidth compared to a full-duplex circuit switched connection. Thus, the transmission rate can be varied, sometimes transmitted at a faster rate and other times sent at a slower rate, or with momentary pauses. Preferably, the average of said variable rate exceeds the constant delivery rate. Furthermore, the transmission rate can be varied depending on the short-term traffic on the wireless channel in order to avoid system overload. Preferably, in order to quickly fill the receive buffer with a desired number of frames and make the delay less noticeable to the user, the data is initially transmitted at a faster rate than said constant rate, assuming the data is initially available. Furthermore, and even if the data is only supplied to the transmitter at the constant delivery rate, a variable transmission rate can be used to quickly replenish the receive buffer in a buffer underflow situation, i.e., if the number of frames in the receive buffer drops below a threshold (for example, as a result of multiple transmissions).

Note that this system introduces a buffer delay between receiving a number of frames and delivering said number of frames to a recipient user as the frames are now not directly delivered when received. Note that the term buffer delay does not necessarily imply that a constant delay is applied to each frame. In fact, if a variable transmission rate is used, the time successive frames wait in the buffer prior to delivery will vary.

As an optional feature, outgoing voicemail message are stored in a transmit buffer prior to transmission so that silence deletion can be applied. This is advantageous since it will reduce the amount of speech data sent over the wireless channel.

According to one aspect of the invention, there is provided a method of delivering unidirectional streaming services (USS) data transmitted via a wireless network, said method comprising the steps of:

a) storing received USS frames in a receive buffer;
b) testing received USS frames for errors;
c) replacing, USS frames received with detected errors prior to delivery; and
d) delivering said USS frames from said buffer at a constant rate responsive to a delay criteria being satisfied;

wherein said replacing step comprises:
i) requesting retransmission of said USS frames received with detected errors;
ii) replacing the USS frames received with detected errors with retransmitted frames provided the retransmitted frames are received without errors in time for delivery; and
iii) if said retransmitted frames are not received without errors in time for delivery, reconstructing the USS frames received with detected errors and discarding any subsequently received retransmission of said frames.

According to another aspect of the invention there is provided a method of delivering unidirectional streaming services (USS) data comprising the steps of:

a) determining whether said USS data requires a symmetrical, bidirectional communication link with a recipient user; and
b) responsive to said determining step determining said USS data does not require such symmetrical, bidirectional communication link with a recipient user, introducing a buffer delay between receiving a number of frames and delivering said number of frames by:
i) receiving in a buffer USS data transmitted with a variable transmission rate; and
ii) delivering said USS data with a constant delivery rate.

Other aspects of the invention include associate transmission methods, and transmitters, receivers, wireless terminals and networks for carrying out the new methods, and voice mail systems for using such systems.

It is to be understood that both the foregoing general description and the following detailed description are exemplary and explanatory and are intended to provide further explanation of the invention as claimed.

BRIEF DESCRIPTION OF THE DRAWINGS

The present invention, together with further objects and advantages thereof will be further understood from the following description of the preferred embodiments with reference to the drawings in which.

DETAILED DESCRIPTION OF THE PREFERRED EMBODIMENTS

In this specification, for clarity we will discuss the application of the invention with reference to the example of voice based unidirectional stream based services. It should be noted that the invention is also applicable to other unidirectional stream based services, for example video.

Figure 1:
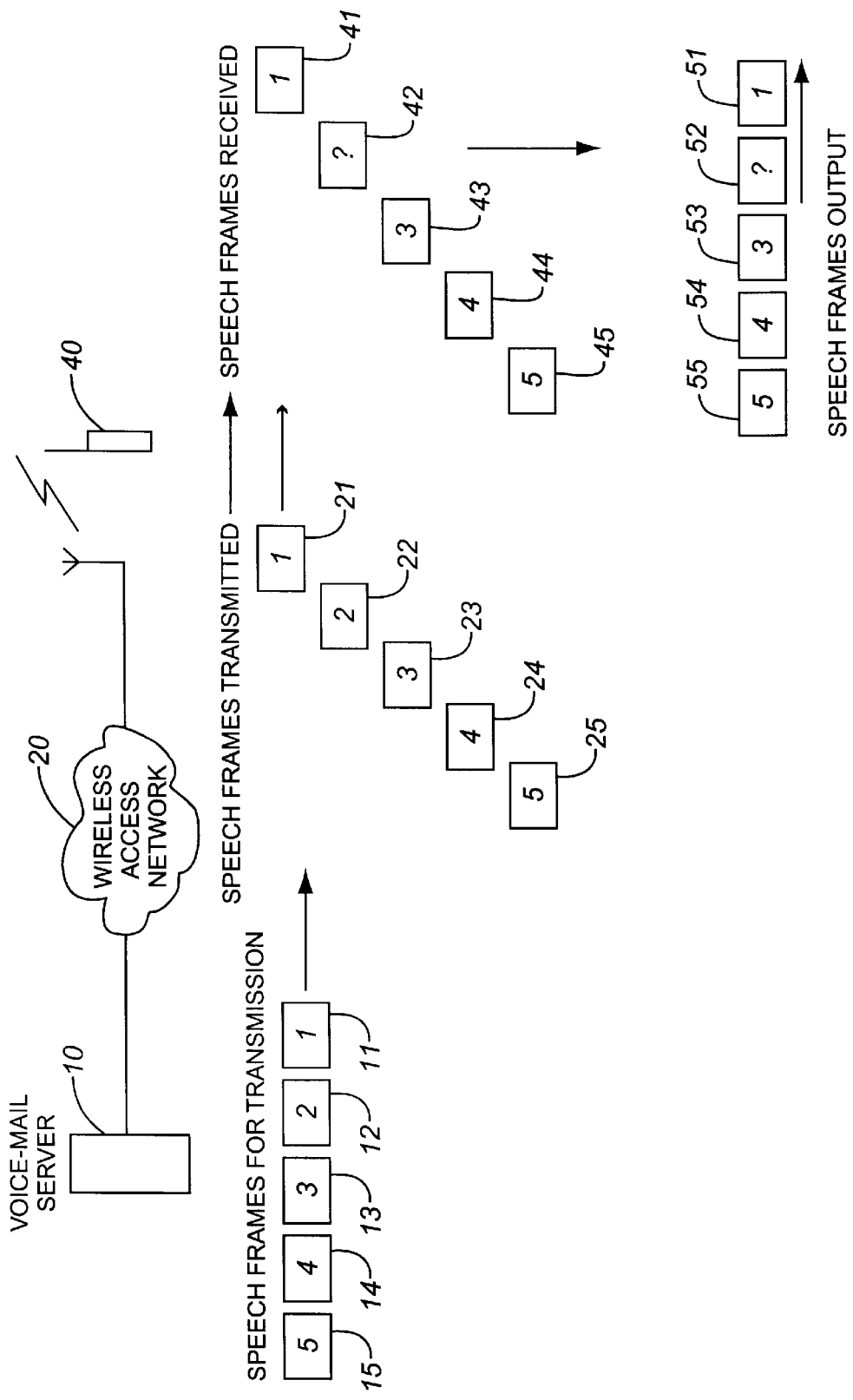
FIG. 1 is a schematic block diagram illustrating a conventional method of providing unidirectional streaming services data.

FIG. 1 is a schematic block diagram illustrating a conventional method of providing unidirectional streaming services data, in this example speech frames from a voice-mail server. Once requested, a voice-mail server 10 will send speech frames 11, 12, 13, 14 and 15 via the wireless network 20 which transmits the speech frames over the wireless interface. The transmitted speech frames 21 through 25 are then received by the wireless terminal. However, in this example, the second speech frame is corrupted during transmission e.g. received in error as a result of a fade in the radio channel. Thus, in this example, receive speech frames 41, 42, 43, 44 and 45 are received such that speech frame 42 does not correspond to transmitted speech frame 12. In a conventional system, the receive speech frames 41 through 45 are then sequentially delivered as speech frames output 51 through 55 with the errored frame 42 being delivered as errored frame 52. Note that in some conventional systems, frame 52 may represent an extrapolation from previous frames, e.g., frame 51, for systems which perform error detection and recognize that frame 42 was received in error.

Figure 2:
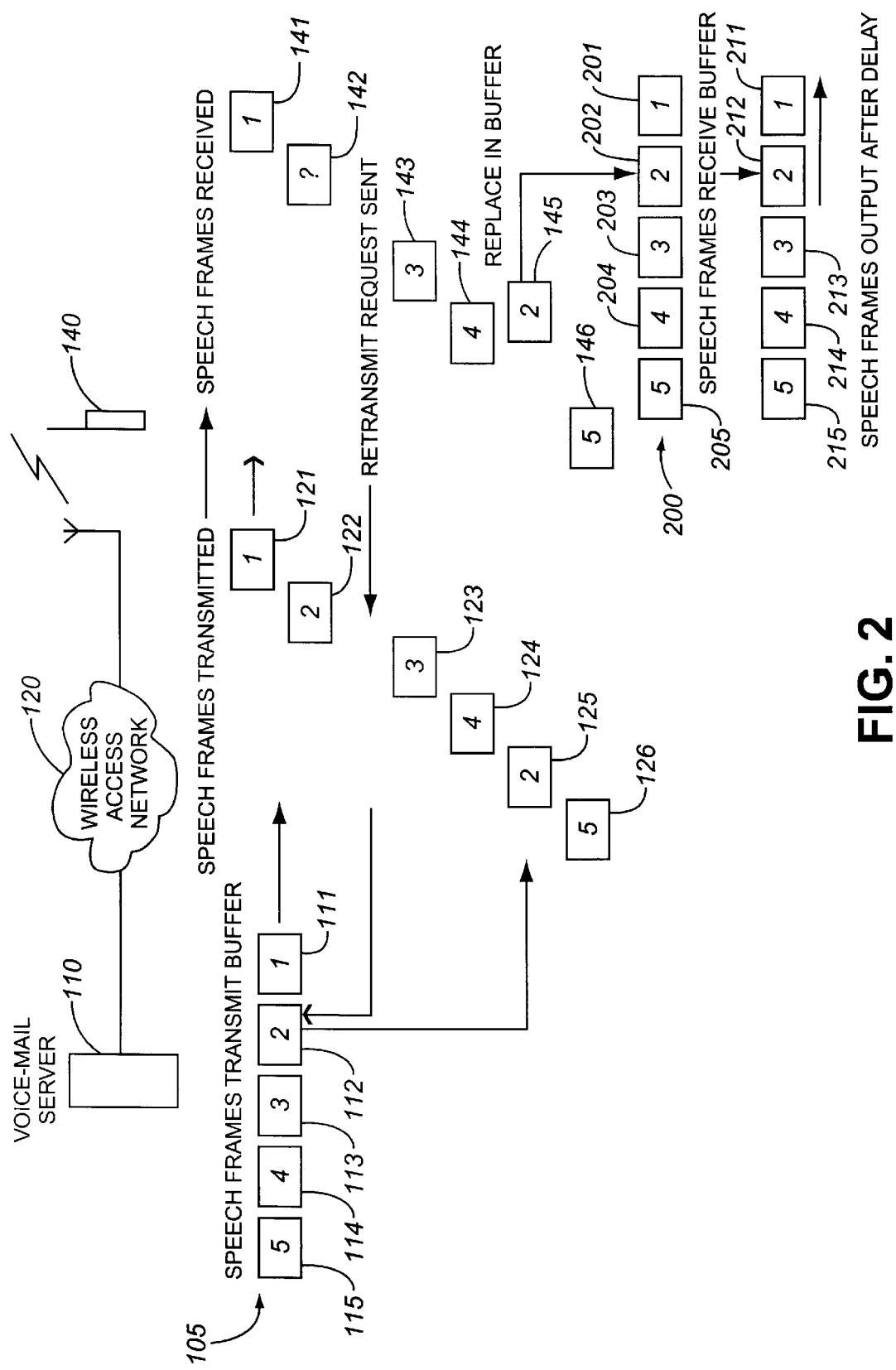
FIG. 2 illustrates a method of providing unidirectional streaming services according to an embodiment of the invention.

FIG. 2 illustrates a method of providing unidirectional streaming services according to an embodiment of the invention. In FIG. 2, a wireless terminal according an embodiment of the invention requests a streaming service, in this example, speech frames from a voice-mail server 110 via the wireless network 120. Wireless network 120 which, in this example, includes at least one Mobile Switching Centre (MSC), at least one Base Station Controller (BSC) and at least one Base Station including transmitters and receivers for transmitting and receiving wireless signals to and from wireless terminals. The speech frames from the voice-mail server are stored in a transmit buffer 105. In this example, speech frames 1 through 5 are stored in buffer locations 111, 112, 113, 114 and 115 as shown. Speech frames are then transmitted to the wireless terminal as shown. Note that in the transmit sequence of frames 121, 122, 123, 124, 125 and 126, an additional frame is transmitted in this example. This additional frame will be explained below. The speech frames received by the wireless terminal 140 are shown to include frames 141, 142, 143, 144, 145 and 146. As can be seen, the second received speech frame 142 is received in error due to corruption of the bits, for example, by a fade on the radio channel. According to this embodiment of the invention, the terminal 140 tests each received frame for errors, detects the error in frame 142 and then transmits to the wireless network a retransmit request. The retransmit request is received and the proper location in the transmit buffer, 112 is accessed and then transmitted once the request is received and processed. Meanwhile, speech frames 123 and 124 from speech transmit buffer locations 113 and 114 are sent and transmitted over the radio interface. Then, speech frame 125, which is a repeat of the second speech frame, is transmitted. The speech frame transmit buffer then continues to send speech frames for transmission. Thus, the next frame 115 from the buffer, is transmitted as speech frame 126, assuming no additional retransmit requests are received.

On the receive side, the received speech frames are stored in a receive buffer 200 in the sequence which they are received. Thus, received frame 141 is located in receive buffer location 201, received frame 142, although received in error, is placed in receive buffer 202 with a suitable tag to indicate that it is in error. Received frames 143 and 144 are consequently put into locations 203 and 204 respectively. Once the retransmitted frame 125 is received as frame 145, the system checks no errors are received in the retransmitted frame 145. If so, and if there is time in the buffer delay prior to the speech frames being delivered, the received frame 145 is placed into location 202 replacing the errored frame 142. Then, the receive frame 146 is stored into the next location in the speech buffer, namely location 205. Once the delay criteria is satisfied, for example, a predetermined period of time has expired or a predetermined number of frames are placed in the buffer, delivery of the speech frames begins. Thus, as shown, speech frames 211, 212, 213, 214 and 215 are then output from the buffer and delivered to the recipient user or recipient application, in this example a speech decoder. Preferably, if the speech frame 145 is not received without errors in time to replace the errored frame 142 in the receive buffer location 202 prior to the receive buffer being output, the system will interpolate using both preceding frames e.g. frame 201 and successive frames e.g. 203 and (possibly 204 etc. ) to produce the best estimate of what should be output as frame 212. The delay criteria is selected as a compromise between allowing sufficient time for frame replacement while minimizing any apparent delay to the user. Note that the criteria depends on several factors which include the size of the buffers, the constant delivery rate, whether a variable transmission rate can be used, and if so, whether the initial transmission rate can exceed the constant delivery rate (which, in this example, depends on whether the voice mail server can supply the voice data at a faster rate than the normal talking rate). A factor to consider in selecting the delay criteria is that, in order to allow for retransmissions to be received in time for delivery, the time between receiving a frame into the buffer and delivering said frame should be longer than the minimum period of time required to receive a requested re-transmitted frame. Preferably, the criteria is selected to accommodate multiple retransmissions.

Figure 3:
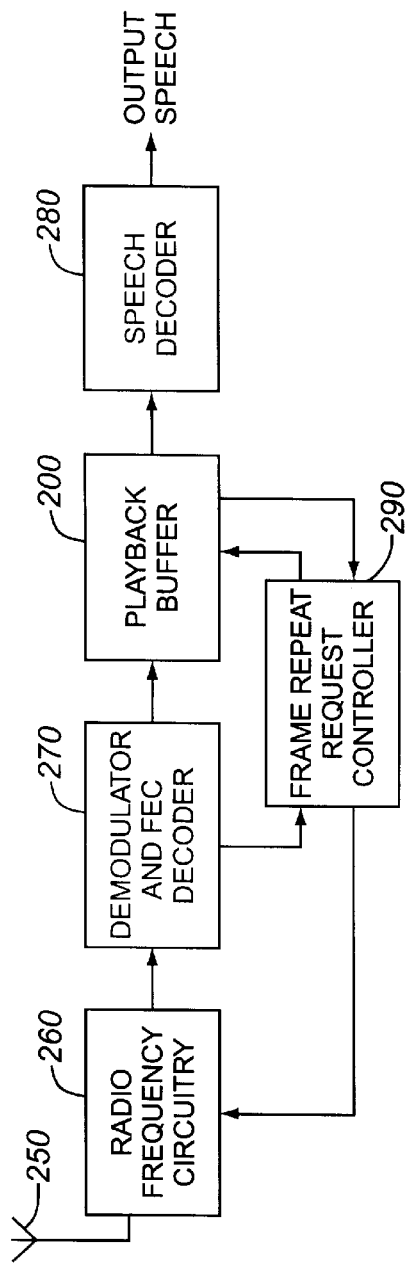
FIG. 3 is a functional block diagram illustrating a wireless receiver according to an embodiment of the invention.

FIG. 3 is a functional block diagram illustrating a wireless receiver according to an embodiment of the invention, which, for the example of FIG. 2, forms part of the terminal 140. The wireless terminal 140 has an antenna 250 connected to radio frequency circuitry block 260 for receiving the wireless transmission from the wireless network. A demodulator and FEC decoder block 270 demodulates the received transmission and tests for errors, either by means of error detection (e.g., by means of CRC), or error correction techniques. In this embodiment, a FEC (forward error correction) decoder is used which attempts to correct any received errors. Uncorrected errors are determined and detected as a received error. Speech frames output from the demodulator and FEC decoder block 270 are stored in a playback buffer 200 before being delivered to a speech decoder 280 which decodes the actual speech frames and converts them into output speech. The terminal also includes a frame repeat request controller 290 which would typically include a microprocessor and associated memory for storing software instructions for controlling the terminal and for carrying out the method steps as disclosed herein. The controller 290 is notified of any detected errors by the FEC decoder 270. The controller 290 also controls the delivery of the speech frames stored in the playback buffer 200 and also replaces frames in the playback buffer which were received in error. The controller 290 generates a retransmission request whenever it receives a notification from the FEC decoder 270 that a frame was received in error. This request is then transmitted via the radio frequency block 260 and the antenna 250 to the wireless network. The controller 290 waits for the retransmitted frame to be received and demodulated and error decoded. If the requested frame is received without error in time to replace the errored frame in the playback buffer 200, then the controller 290 replaces the errored frame with the received retransmitted frame, prior to delivery to the speech decoder 280. Otherwise, the controller preferably replaces the errored frame by interpolating the previous and succeeding frames prior to delivery to the speech decoder 280. Thus, the buffer 200 allows for the interpolating of both previous and successive frames to more accurately estimate the contents of the errored frame than conventional extrapolation techniques. As an alternative, depending on the type of voice coding and interpretation used, the controller can send a control message to the speech decoder indicating a frame is in error, wherein the speech decoder performs the interpolation.

Figure 4:
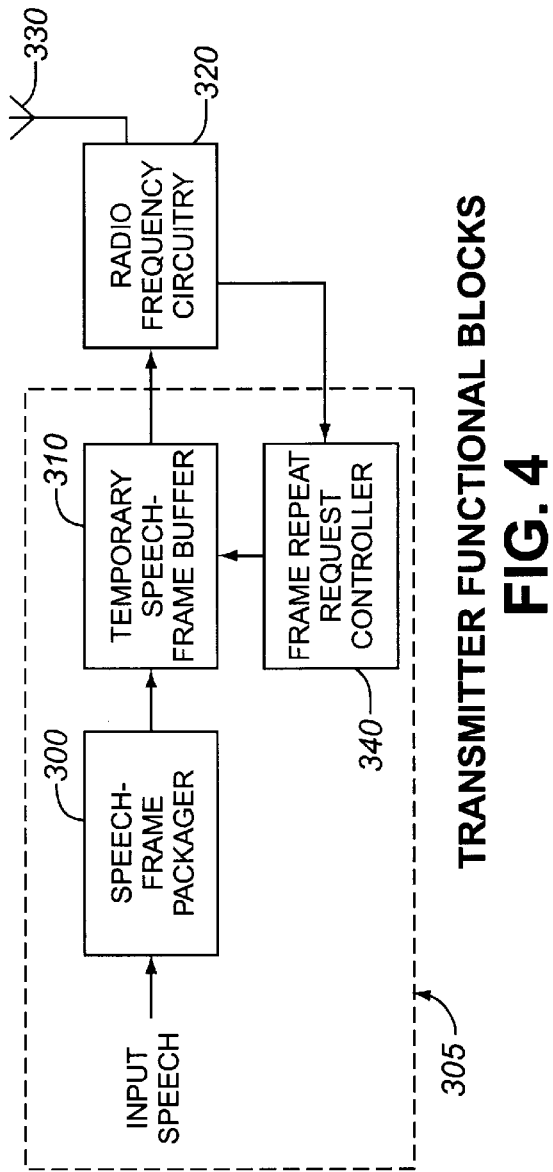
FIG. 4 is a functional block diagram illustrating a transmitter according to an embodiment of the invention.

FIG. 4 is a functional block diagram illustrating a transmitter according to an embodiment of the invention. Note that FIG. 4 and FIG. 3 do not illustrate all the necessary elements of a receiver or transmitter but only illustrate the blocks necessary for carrying out the invention. Furthermore, the blocks of FIG. 4 are not necessarily located in the same entity. For example, the transmitter for a terminal will likely include all of the blocks of FIG. 4. However, the blocks located within box 305 are not necessarily included in a base station transmitter, but rather may form part of another entity, for example, form part of a BSC or MSC or an Interworking Function (IWF) as described with reference to FIG. 6. Also, FIGS. 3 and 4, for simplicity uses the example of speech frames. However, it should be noted that other unidirectional streaming services data can be processed.

Referring to FIG. 4, input speech frames, for example, frames from a voice-mail server 110 are packaged by speech frame packager 300 and stored in a temporary speech frame buffer 310 prior to transmission by the base station radio frequency circuitry 320 and antenna 330. Note that if the input is PCM, the packager 300 low-bit rate encodes the speech and delivers speech frames to the transmit buffer 310. If the input speech is received from the voice mail service in a low-bit rate format, the function of the speech frame packager is to reformat the speech into the frame structure expected by the frame buffer. The transmitter also includes a frame repeat request controller 340 which typically includes a microprocessor and associated memory for storing software instructions which are executed by said microprocessor for controlling the transmission and for carrying out the method steps as described. Note that functions 300, 310 and 340 may not necessarily be physically located at the base station. The frame repeat request controller in this embodiment recognizes received retransmit requests from a particular transmitter terminal (which in this example is the terminal 140). The requested frames are then accessed by the temporary speech frame buffer and then retransmitted according to the method described in FIG. 2. More details of this method will be discussed below with reference to FIG. 5 which is a flowchart describing the steps carried out by the controllers 290 and 340 for carrying out the method according to an embodiment of the invention.

Figure 5:
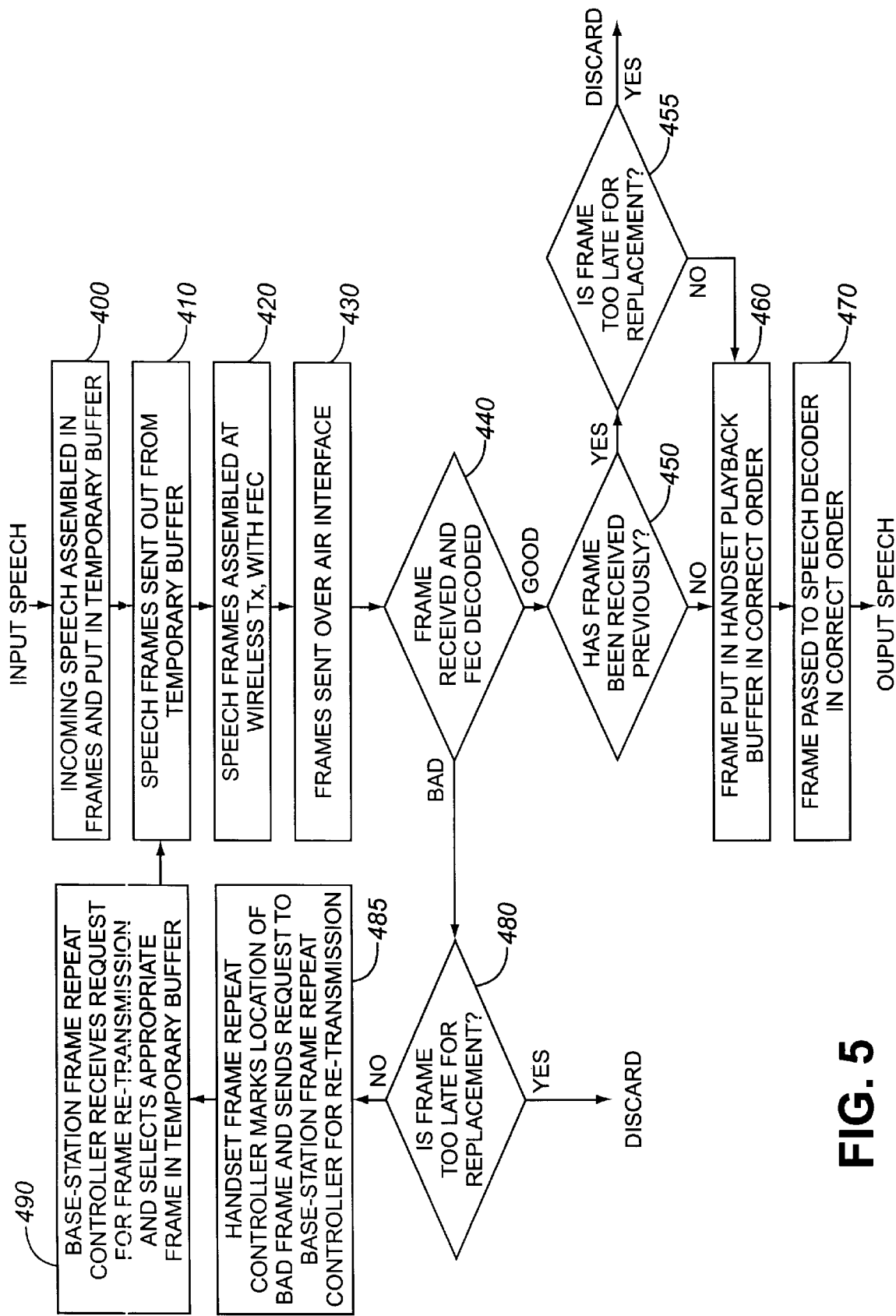
FIG. 5 is a flowchart describing the steps for carrying out the described method according to an embodiment of the invention.

In FIG. 5, steps 400, 410, 420, 430 and 490 are executed by the transmitter controller 290 whereas steps 440, 450, 445, 460, 470, 480 and 485 are executed by the receiver controller 290 according to this example, which assumes that a unidirectional streaming service is being sent from the base station to the terminal. However, it should be noted that it is possible for the direction to be reversed and unidirectional streaming services data can be sent from the wireless terminal to the base station. Assuming the base station is sending the unidirectional streaming service data in the form of speech data, the input speech is assembled in frames and put in the temporary buffer 400. These speech frames are then sent out from the temporary buffer 410 and then assembled at the wireless transmitter with FEC encoding 420 for transmission over the air interface 430. Once received by the wireless terminal, the frame is tested for errors, in this example by FEC decoding 440. Assuming that the FEC decoder can correct any received errors, then the system checks whether the frame has been received previously 450, (i.e. is this a retransmitted frame). Assuming this is a retransmitted frame, the controller 290 determines whether the frame is too late for replacement 455. If the frame is too late for replacement, the received frame is discarded and the errored frame in the terminal buffer is preferably replaced by interpolation as described. If the frame had not been previously been received, the frame is put in the handset playback buffer in the correct order 460. Frames are stored in the playback buffer in order to allow for retransmission and frame replacement. Once the delay criteria is satisfied, frames in the buffer are delivered to the speech decoder in correct order 470 so that output speech can be delivered to the end user recipient.

Returning to step 440, if the controller 290 detects an error in a received frame e.g., the FEC decoder cannot correct all errors, the controller determines whether the frame is too late for replacement 480. If too late, the frame is discarded. However, if there is sufficient time for replacement, the frame repeat request controller 290 marks the location of the bad frame in the playback buffer 200 and sends a request to the base station frame repeat controller to retransmit the errored frame. Preferably, retransmission is requested based on the controller's estimates of whether there is sufficient time to receive a retransmitted frame prior to delivery. This estimate can be determined in various ways (for example, based on the time between requesting and receiving a previously requested frame). The retransmit request is transmitted over the radio interface to the network wherein it is received and recognized by the frame repeat request controller 340 which selects the appropriate frame from the temporary speech frame buffer and retransmits that frame by delivering it to the base station radio frequency circuitry for appropriate modulation, frequency coding and transmission.

Note that the method of FIG. 5 is only used for unidirectional streaming services data, and is not used for conventional, interactive streaming services, such as a conventional, interactive voice call. Thus, the decision to invoke the methods described in order to allow for retransmission of errored packets depends on a determination that the service is unidirectional, and therefore does not require a symmetrical, bidirectional communication link with a recipient user. Note that we exclude unidirectional services which send delay sensitive data, such as timing or certain telemetry services. This determination can be made in a number of ways:

i) by means of an explicit identification of the unidirectional nature of the service, either by the service provider or requester;

ii) by noting the number dialed (or URL) and correlating with a database of known voice-mail or streaming audio servers (could be done in the wireless terminal itself or in the radio access network with a corresponding signal sent back to the wireless terminal);

iii) by using flow-classification techniques to determine that packet flows are essentially unidirectional and have the characteristics of a voice (or video) service;

iv) by using packet "sniffing" techniques where the header and payloads of packets are inspected and the content established by observing various parameters; or v) by means of a higher layer protocol adopted for this purpose.

Figure 6:
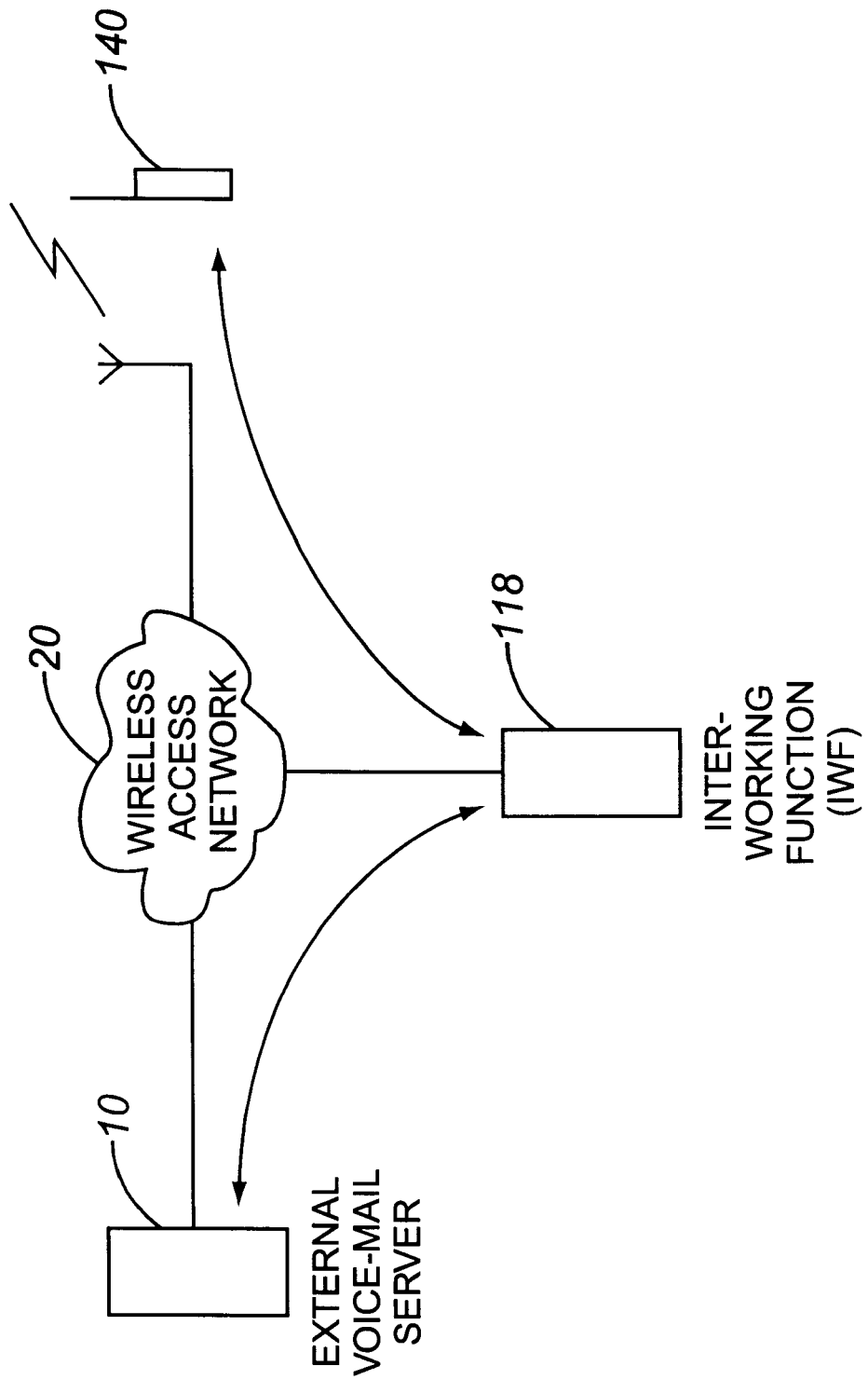
FIG. 6 is a schematic diagram illustrating a wireless network according to an embodiment of the invention including an additional interworking function (IWF).

FIG. 6 is a schematic diagram illustrating a wireless network according to an embodiment of the invention wherein an Inter-Working Function (IWF) 118 acts as an intermediate internetworking server to support the ARQ protocol to the user. Thus, neither conventional voice-mail servers nor base stations need be changed. Rather, the IWF 118, which can form part of the MSC or can be a separate peripheral, would include the blocks within box 305 of FIG. 4. In this case, when wireless terminal 140 accesses external voice-mail server 10, a return connection is established via IWF 118. Speech data is transferred conventionally (i.e., in real-time) between external voice-mail server 10 and IWF 118, where it is stored temporarily. The methods described in this invention for providing retransmission etc., are then applied between IWF 118 and wireless terminal 140.

Figure 7:
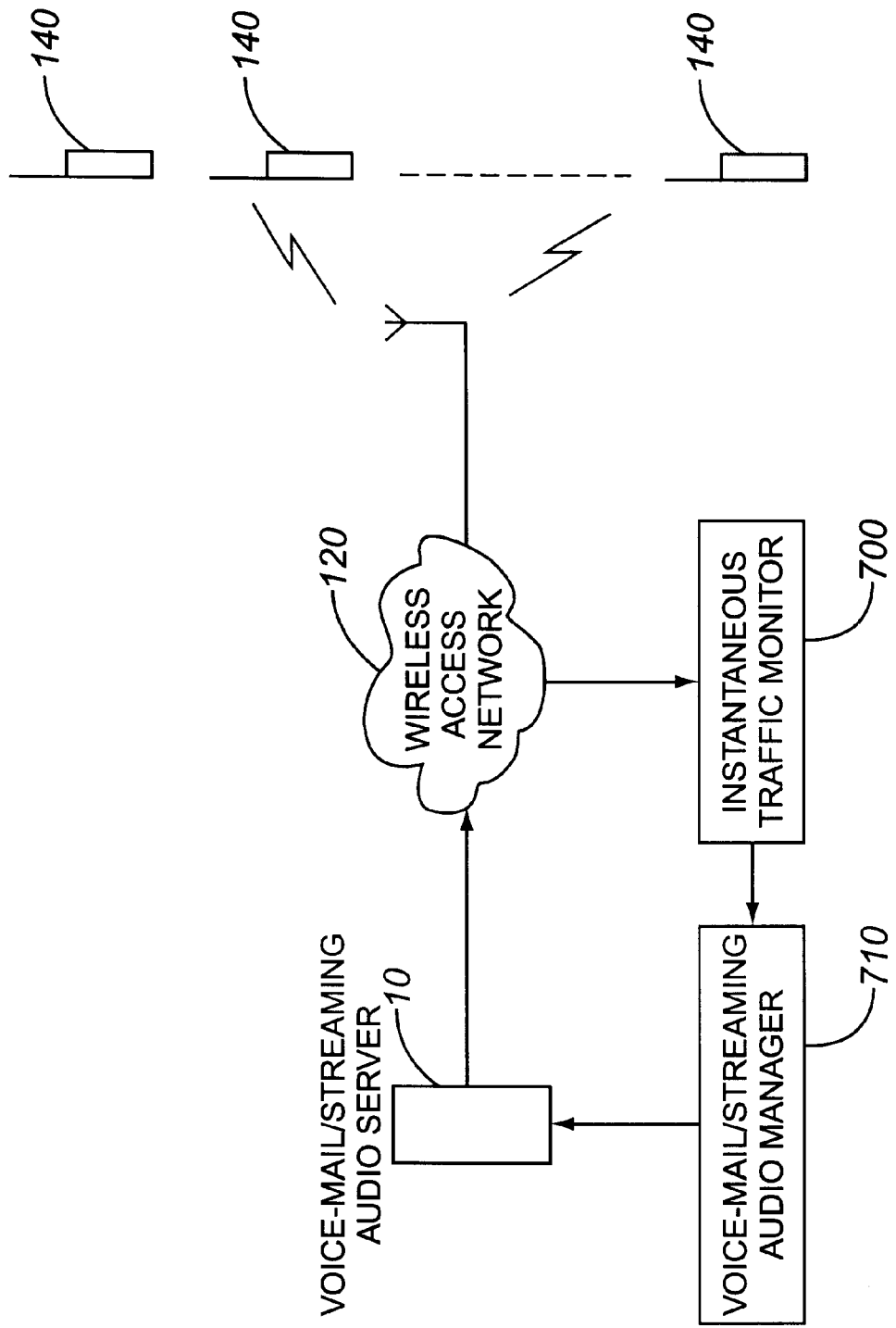
FIG. 7 is a schematic block diagram illustrating an embodiment of the invention which uses flow control to reduce periods of system overload.

We have discussed the advantages of adding the buffer for the purpose of replacing frames which were received with errors. However, another advantage of the introducing a buffer between reception and delivery is the ability to perform flow control. For example, a wireless network supporting multiple terminals can perform flow control in order to reduce periods of system overload. Thus, as shown in FIG. 7 according to an embodiment of the invention, the wireless access network includes traffic monitor 700 for determining short-term traffic load over the radio interface. A voice-mail/streaming manager 710 is also used to determine the optimum time and rate to send USS data over the air interface based on the delivery requirements for said data and based on the traffic load as measured by the traffic monitor. This streaming manager, which may be implemented in the base station/BSC or in a separate server elsewhere in the wireless network, can be used for flow control purposes. As the speech data is buffered in the remote terminal before delivery to the user, speech data need not be transmitted over the wireless interface at a normal talking rate. Therefore, the streaming manager can either send data at a rate either faster or slower, or even pause momentarily, depending on the traffic on the wireless channel as a means of avoiding overload. Thus, this allows for increasing the transmission rate if the overall traffic load allows extra bandwidth and decreasing the transmission rate if the overall traffic load is short of bandwidth.

Furthermore, in the case where the terminal retrieves a voice-mail message, silence deletion such as typically applied in voice-mail systems to reduce storage requirements, can be applied at the server or base station (with appropriate signaling to indicate their duration) to reduce the amount of speech data sent over the wireless channel. The deleted silence can be later reinserted by the wireless terminal.

Preferably the wireless network will allocate an associated control channel (which may be full duplex) to such a unidirectional streaming service for quickly sending control messages with minimal delays. Such control signals can be used to adjust the output of frames in the buffer responsive to said control signals. In this context, the buffer can be either the transmit or receive buffer, and the output can refer to either transmission or delivery. For example, the retransmission request can be sent as a packet on a packet channel, or, in order to reduce delays, can be sent as a control message on an associated control channel. As another example, flow control messages requesting increases or decreases in the transmission rate would advantageously be transmitted on such a control channel. As another example, DTMF signals representing commands in a voice mail application would be advantageously transmitted on a control channel, thus bypassing the transmit and receive buffers.

Such a control channel will preferably operate in real-time or near real-time to minimize delays. The control channel should be defined as logically distinct from the streaming information (and should by-pass the transmit and receiver buffers). The control and streaming channels can be multiplexed on a single physical channel or use two distinct channels (e.g., fundamental and supplemental channel in cdma2000). In a network context, the "control" and "streaming" channel would have different virtual circuits and QofS metrics.

Note that if variable rates cannot be used (either because of the system used or short-term capacity), retransmitted frames can optionally be transmitted as packets on a secondary channel, for example, the control channel, to quickly replace the errored frame without varying the normal transmission rate. In this case the transmitter will respond to retransmission requests by transmitting requested frames on the secondary channel and the receiver would monitor the secondary channel for the retransmitted frames.

Note that we have described a system using the example of a voice-mail server message being retrieved by a wireless terminal. However, the system can work in reverse if a user leaves a message on a voice-mail server via a wireless terminal. In this example, a longer receive delay can be utilized as the voice mail server can tolerate a longer delay than would a human user. Furthermore, voice mail systems could be designed which would not even require a constant delivery rate. Thus, network bandwidth can be saved by allocating less bandwidth to the terminal than would normally be required. However, the terminal must transmit at a rate which will prevent its transmit buffer from entering into an overflow situation, where the transmit buffer is filled to capacity. Preferably, the terminal will monitor the state of its transmit buffer and increase its transmission rate to prevent a transmit buffer overflow. Typically, this will involve the terminal sending a control message to the network requesting increased bandwidth.

Various enhancements can be made for a wireless voice mail system using the above system. For example, for a voice mail system configured for such USS data delivery, voice prompts and commands can be transmitted on an associated control channel for adjusting the output from said buffers. For example, if a user listening to a long message decides to skip to the next message by pressing an appropriate key, the DTMF will be sent on the control channel, and the system can preferably purge the transmit buffer and start to transmit the next message at an increased transmission rate to quickly overwrite the receive buffer with the next message. Preferably, such a voice mail system can send voice data to the transmit buffer at a faster rate than the constant delivery rate, for example, by using the Internet Message Access Protocol (IMAP), so as to allow for increased transmission rates.

Numerous modifications, variations and adaptations may be made to the particular embodiments of the invention described above without departing from the scope of the invention, which is defined in the claims.

What is claimed is:

1. A method of delivering unidirectional streaming services (USS) data transmitted via a wireless network, said method comprising the steps of:
   a) storing received USS frames in a receive buffer;
   b) testing received USS frames for errors;
   c) replacing, USS frames received with detected errors prior to delivery; and
   d) delivering said USS frames from said buffer at a constant rate responsive to a delay criteria being satisfied;
   wherein said replacing step comprises:
      i) requesting retransmission of said USS frames received with detected errors;
      ii) replacing the USS frames received with detected errors with retransmitted frames provided the retransmitted frames are received without errors in time to be delivered at said constant rate; and
      iii) if said retransmitted frames are not received without errors in time to be delivered at said constant rate, reconstructing the USS frames received with detected errors and discarding any subsequently received retransmission of said frames.

2. The method as claimed in claim 1 wherein the delay criteria is such that the time between storing a frame into said buffer and delivering said frame is longer than the minimum period of time required to receive a requested retransmitted frame.

3. The method as claimed in claim 2 wherein frames are received at a transmission rate, wherein the average of said transmission rate is faster than the constant rate.

4. The method as claimed in claim 3 wherein frames are received at a variable rate.

5. The method as claimed in claim 2 wherein frames are initially received at a rate faster than said constant rate to quickly place frames in said buffer in order to quickly satisfy said delay criteria.

6. The method as claimed in claim 5 wherein said replacing step further comprises estimating whether there is sufficient time to receive a retransmitted frame, and only requesting retransmission if sufficient time is estimated and wherein said reconstructing step uses information from both previous and subsequent frames to reconstruct the frame.

7. A method of delivering unidirectional streaming services (USS) data comprising the steps of:
   a) determining whether said USS data requires a symmetrical, bidirectional communication link with a recipient user; and
   b) responsive to said determining step determining said USS data does not require such symmetrical, bidirectional communication link with a recipient user, introducing a buffer delay between receiving a number of frames and delivering said number of frames by:
      i) receiving in a buffer USS data transmitted with a variable transmission rate; and
      ii) delivering said USS data with a constant delivery rate.

8. The method as claimed in claim 7 further comprising:
testing received USS frames for errors;
requesting retransmission of said USS frames received with detected errors; and
replacing the USS frames received with detected errors with retransmitted frames provided the retransmitted frames are received in time to be delivered at said constant delivery rate.

9. The method as claimed in claim 8 wherein the buffer delay is such that the time between initially receiving a frame into said buffer and delivering said frame is longer than the minimum period of time required to receive a requested retransmitted frame.

10. The method as claimed in claim 9 wherein said requesting step further comprises estimating whether there is sufficient time to receive a retransmitted frame, and not requesting retransmission if sufficient time is not estimated to be available;
   and wherein if said retransmitted frames are not received without errors in time for delivery, using information from both previous and subsequent frames to reconstruct USS frames received with detected errors.

11. The method as claimed in claim 4 further comprising the steps of:
monitoring the state of said buffer; and
responsive to said buffer satisfying specified criteria, sending a message requesting the transmission rate be varied.

12. A method of transmitting USS data to a receiver adapted to carry out the method as claimed in claim 2 comprising the steps of:
storing USS data frames to be transmitted in a transmit buffer;
transmitting frames stored in said buffer at a transmission rate;
monitoring said wireless network for retransmission requests from said receiver; and
responsive to receiving a retransmission request, retransmitting the requested USS data.

13. A method of transmitting USS data to a receiver adapted to carry out the method as claimed in claim 3 comprising the steps of:
storing USS data frames to be transmitted in a transmit buffer;
transmitting frames stored in said transmit buffer at a variable rate;
monitoring said wireless network for retransmission requests from said receiver; and
responsive to receiving a retransmission request, retransmitting the requested USS data.

14. The method as claimed in claim 13 further comprising the step of monitoring the overall traffic load and wherein the steps of transmitting USS data further include transmitting USS data at a rate either faster or slower than the constant rate, depending on the overall traffic load.

15. The method as claimed in claim 13 further comprising the steps of applying silence deletion to speech data stored in said transmit buffer prior to transmission.

16. A method of transmitting USS data to a receiver adapted to carry out the method as claimed in claim 7 comprising the steps of:
storing USS data frames to be transmitted in a transmit buffer;
monitoring the overall traffic load; and
transmitting frames stored in said transmit buffer at a transmission rate either faster or slower than the delivery rate, depending on the overall traffic load.

17. A method of transmitting USS data to a receiver adapted to carry out the method as claimed in claim 8 comprising the steps of:
storing USS data frames to be transmitted in a transmit buffer;

monitoring the overall traffic load; and transmitting frames stored in said transmit buffer at a transmission rate either faster or slower than the delivery rate, depending on the overall traffic load.

18. The method as claimed in claim 17 further comprising the steps of applying silence deletion to speech data stored in said buffer prior to transmission.

19. The method as claimed in claim 12 further comprising initially transmitting data at a faster rate than said constant rate.

20. A method of transmitting USS data to a receiver adapted to carry out the method as claimed in claim 8 comprising initially transmitting data at a faster rate than said constant rate.

21. The method as claimed in claim 20 further comprising the steps of:

storing USS data frames to be transmitted in a transmit buffer;

monitoring the overall traffic load; and controlling said transmission rate depending on the overall traffic load.

22. The method as claimed in claim 21 wherein said controlling step comprises increasing the transmission rate if the overall traffic load allows extra bandwidth and decreasing the transmission rate if the overall traffic load is short of bandwidth.

23. The method as claimed in claim 12 further comprising the steps of:

monitoring the state of the transmit buffer; and increasing the transmission rate to prevent transmit buffer overflow.

24. The method as claimed in claim 13 wherein control signals are transmitted and received on an associated control channel and further comprising the step of adjusting the output of frames in said buffer responsive to said control signals.

25. The method as claimed in claim 17 wherein control signals are transmitted and received on an associated control channel and further comprising the step of adjusting the output of frames in said buffer responsive to said control signals.

26. The method as claimed in claim 13 wherein retransmission requests and packets are transmitted on a secondary channel.

27. The method as claimed in claim 17 wherein retransmission requests and packets are transmitted on a secondary channel.

28. A receiver comprising:

radio circuitry for receiving wireless signals;

a receive buffer; and a controller for carrying out the method of claim 1.

29. A receiver comprising:

radio circuitry for receiving wireless signals;

a receive buffer; and a controller for carrying out the method of claim 5.

30. A receiver comprising:

receive circuitry for receiving transmitted signals;

a receive buffer; and a controller for carrying out the method of claim 8.

31. A terminal comprising:

a transceiver for receiving and transmitting signals to a wireless network;

a receive buffer;

a transmit buffer; and a controller for carrying out the method of claim 13.

32. A terminal comprising:

a transceiver for receiving and transmitting signals to a wireless network;

a receive buffer;

a transmit buffer; and a controller for carrying out the method of claim 23.

33. A wireless network basestation comprising:

a transceiver for receiving and transmitting signals to a terminal;

a receive buffer;

a transmit buffer; and a controller for carrying out the method of claim of claim 12.

34. A wireless network basestation comprising:

a transceiver for receiving and transmitting signals to a terminal;

a receive buffer;

a transmit buffer; and a controller for carrying out the method of claim of claim 13.

35. A wireless network basestation comprising:

a transceiver for receiving and transmitting signals to a terminal;

a receive buffer;

a transmit buffer; and a controller for carrying out the method of claim of claim 27.

36. A wireless network comprising a base station and an interworking function server in communication with said base station, said interworking function server adapted to carry out the method of claim 12.

37. A wireless network comprising a base station and an interworking function server in communication with said base station, said interworking function server adapted to carry out the method of claim 21.

38. A wireless network comprising a base station and an interworking function server in communication with said base station, said interworking function server adapted to carry out the method of claim 15.

39. A wireless network comprising a base station and an interworking function server in communication with said base station, said interworking function server adapted to carry out the method of claim 25.

40. A wireless network comprising a base station and an interworking function in communication with said base station, said interworking function adapted to carry out the method of claim 23.

41. A wireless network as claimed in claim 40 further comprising a traffic monitor for monitoring system capacity and for controlling said interworking function so as to transmit frames stored in said buffer at a transmission timing either faster or slower than the delivery timing, depending on the short-term overall traffic load.

42. A voicemail system for use in the wireless network as claimed in claim 40, wherein said voicemail system includes said interworking function.

43. A method as claimed in claim 13 wherein said reconstructing step uses information from both previous and subsequent frames to reconstruct the frame.

44. A method of delivering unidirectional steaming services (USS) data transmitted via a wireless network, said method comprising the steps of:

a) initially adding a delay prior to delivering USS data by storing received USS frames in a receive buffer;
b) testing received USS frames for errors;
c) replacing, USS frames received with detected errors prior to delivery; and
d) delivering said USS frames from said buffer at a constant rate responsive to a delay criteria being satisfied;
   wherein said replacing step comprises:
   i) requesting retransmission of said USS frames received with detected errors;
   ii) replacing the USS frames received with detected errors with retransmitted frames provided the retransmitted frames are received without errors in time to be delivered at said constant rate; and
   iii) if said retransmitted frames are not received without errors in time to be delivered at said constant rate, reconstructing the USS frames received with detected errors and discarding any subsequently received retransmission of said frames.

* * * * *